No. 674,669. Patented May 21, 1901.
C. R. BOTSFORD.
MOUSE TRAP.
(Application filed Dec. 20, 1900.)
(No Model.)

WITNESSES:
Henry Ling
Russell M. Everett

INVENTOR:
Charles R. Botsford.
BY
Drake & Co.
ATTORNEYS.

UNITED STATES PATENT OFFICE.

CHARLES R. BOTSFORD, OF NEWARK, NEW JERSEY.

MOUSE-TRAP.

SPECIFICATION forming part of Letters Patent No. 674,669, dated May 21, 1901.

Application filed December 20, 1900. Serial No. 40,479. (No model.)

*To all whom it may concern:*

Be it known that I, CHARLES R. BOTSFORD, a citizen of the United States, residing at Newark, in the county of Essex and State of New Jersey, have invented certain new and useful Improvements in Mouse-Traps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to that class of traps in which a bait serves merely by its position to induce the animal to step upon or press against a trigger for springing the trap; and the objects of the invention are to provide upon the body of the trap a convenient and appropriate receptacle for said bait; to thus enable the bait to be carried by the trap and without danger of spilling, so that the trap can be baited and "set" wherever desired and then placed in any less accessible place which may be frequented by the animals; to thus permanently insure a proper relative position of trap and bait and to secure greater cleanliness; to secure a cheap and simple construction such as can be readily stamped out of sheet metal, and to obtain other advantages and results, some of which may be referred to hereinafter in connection with the description of the working parts.

The invention consists in the improved mouse-trap and in the arrangements and combinations of parts of the same, all substantially as will be hereinafter set forth and finally embraced in the clauses of the claim.

Figure 1:
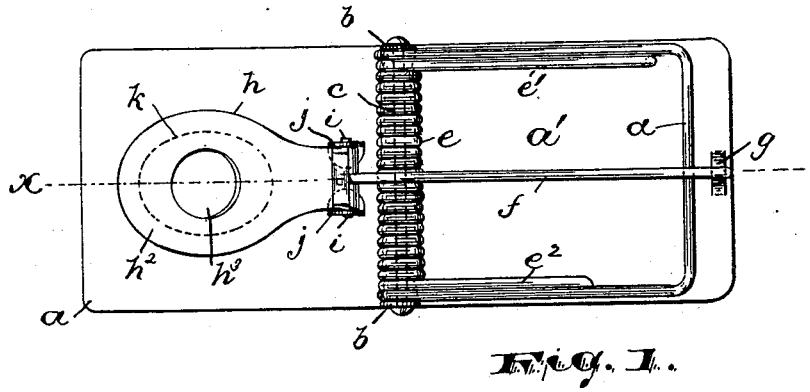
Figure 2:
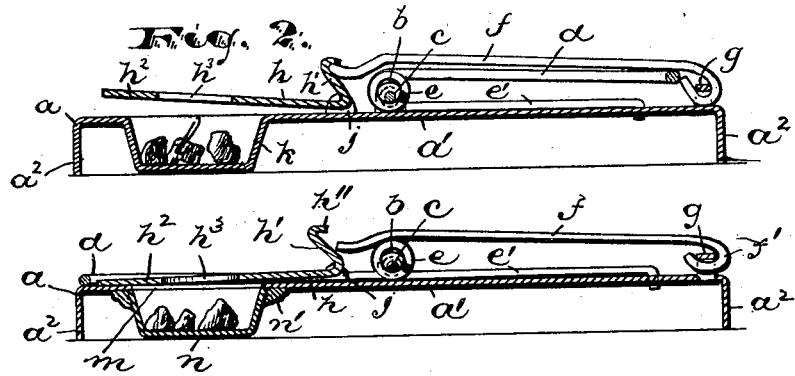
Figure 3:
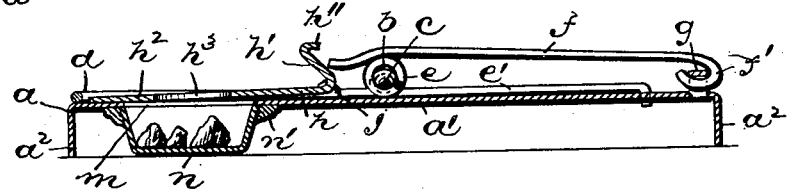
Figure 6:
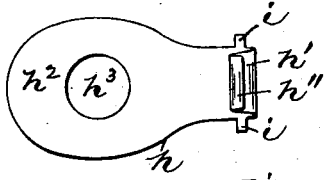
Figure 4:
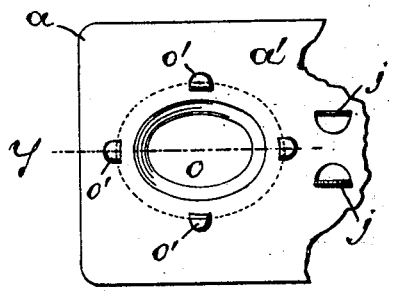
Figure 5:
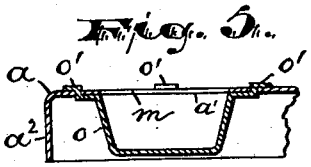

Referring to the accompanying drawings, in which like letters of reference indicate corresponding parts in each of the several views, Figure 1 is a plan of the improved trap as set, and Fig. 2 is a longitudinal central section of the same as on line $x$, Fig. 1. Fig. 3 is a similar longitudinal central section showing the trap sprung and illustrating a soldering of the bait-cup in place; and Figs. 4 and 5 illustrate in plan and section, respectively, another means of attaching the bait-cup, Fig. 5 being a section on line $y$ of Fig. 4. Fig. 6 is a plan of the tripping-pedal or trigger.

In said drawings, $a$ indicates the body of the trap, which is preferably stamped out of sheet metal, the edges or portions of the edges of the piece of sheet metal being bent downward, as at $a^2$, to support the middle or main part $a'$ horizontally above the floor at a suitable height.

At about the middle of the length of the body $a$ and at or near the opposite sides thereof of lugs $b\ b$ are struck up from the sheet-metal plate $a'$ and perforated to receive a transverse bar $c$, and upon said transverse bar are hinged the ends of the arms of a U-shaped jaw $d$, preferably bent out of heavy wire and adapted to lie upon the body-plate $a'$ of the trap at either side of the pivotal bar $c$ and be swung from one side to the other. A spring $e$ is coiled upon the transverse bar $c$ and made fast at one end, $e'$, to the body $a$ of the trap, while the other end, $e^2$, the spring being brought under tension, engages the U-shaped jaw to normally force said jaw down upon the forward end of the trap to engage and hold an entrapped animal, as will be understood.

In setting the trap the jaw $d$ is bent backward upon the rear end of the body of the trap against the power of the spring $e$, and at said rear end of the trap beyond the point to which the jaw reaches is hinged a locking-lever $f$ for holding the jaw when bent back. Said locking-lever is centrally disposed with reference to the width of the trap and is preferably bent out of wire, with an eye $f'$ at one extremity adapted to receive a loop $g$, struck up from the body-plate $a'$, or any other suitable pivotal support. When the trap is set, this locking-lever extends over the jaw $d$ and above the transverse bar $c$ and spring $e$ to the forward end of the trap, where its end catches under the hooked extremity $h''$ of the upwardly-bent rear arm $h'$ of a pedal $h$, pivoted intermediate of its ends, preferably by integral pintles $i$ at its opposite side edges entering perforated lugs $j$, struck up from the body-plate $a'$, although any other suitable manner of pivoting may be employed.

The pedal is preferably formed of sheet metal and in a general way lies parallel to the body portion of the trap, although when the trap is set, as in Fig. 2, the front end of the pedal is slightly elevated, and when the trap is sprung, as in Fig. 3, it is slightly depressed from exact parallelism.

The broad forward arm or main part $h^2$ of the pedal is centrally disposed with reference to the front half of the trap, so that it lies within the U-shaped jaw when the trap is sprung. At the center of the pedal is an orifice $h^3$, through which the animal reaches for the bait, and around said orifice is the annular body part of the pedal, on which the animal steps and by his weight springs the trap, as will be understood.

Beneath the pedal $h$ and orifice $h^3$ therein I stamp in the body portion $a$ of the trap an integral depending bait-receptacle $k$, adapted to inclose and contain the bait $l$, while permitting it to be reached through the orifice in the pedal. This receptacle $k$ may be of any shape, size, or depth desired and is formed in the process of stamping out the sheet-metal body $a$ without any extra operations or cost. It provides a place or receptacle for the bait which is an integral part of the trap, and thus the trap can be baited and made all ready for catching before it is carried to its final position. Moreover, the relative position of the bait and pedal-orifice $h^3$ cannot be disturbed by a movement of the trap. Neatness and cleanliness are secured by providing a special receptacle for the bait and no pieces or crumbs therefrom can fall on the floor or be scattered around. Again, the bait being entirely above the integral body of the trap there can be no access to the bait from beneath and it is not necessary to turn down a continuous flange $a^2$ to support the trap, but separated portions or legs only may be turned down, as before intimated.

I have shown in Figs. 3, 4, and 5 the adaptation of my idea to a trap whose body has a registering aperture $m$ beneath the pedal-orifice $h^3$, where practically the same results can be secured by attaching a separately-formed bait-receptacle $n$ by solder $n'$, as in Fig. 3, by lugs $o'$, as in Figs. 4 and 5, or in any other suitable way. The obvious advantages of an integral bait-receptacle, however, make it the only practical and feasible way of putting the trap on the market.

Having thus described the invention, what I claim as new is—

1. In a trap, the combination with a spring-controlled jaw, a locking-lever, and an apertured tripping-pedal, of a body portion formed out of sheet metal and providing fulcrumal bearings for said jaw, lever, and pedal, and having upon itself a depending bait-receptacle beneath the said pedal, substantially as set forth.

2. In a trap, the combination of a spring-controlled jaw $d$, a locking-lever $f$, and an apertured pedal $h$, of a body portion stamped out of sheet metal and providing fulcrumal supports for the said parts, said body being imperforate beneath the pedal and having integrally formed in said imperforate part by the act of stamping a depending bait-receptacle whose interior is thereby inaccessible from beneath said body portion, substantially as set forth.

3. In a trap, the combination with a spring-controlled jaw $d$, a locking-lever $f$, and an apertured pedal $h$, of a body portion $a$, stamped out of a single integral sheet of metal and providing beneath the said pedal a sunken seat or receptacle adapted to hold the bait in position to be reached through the aperture of the pedal, substantially as set forth.

In testimony that I claim the foregoing I have hereunto set my hand this 18th day of December, 1900.

CHARLES R. BOTSFORD.

Witnesses:
CHARLES H. PELL,
C. B. PITNEY.